July 5, 1932.   W. S. ALLEN   1,865,607
APPARATUS FOR THE MANUFACTURE OF SULPHURIC ACID
Original Filed Aug. 29, 1924   2 Sheets-Sheet 1
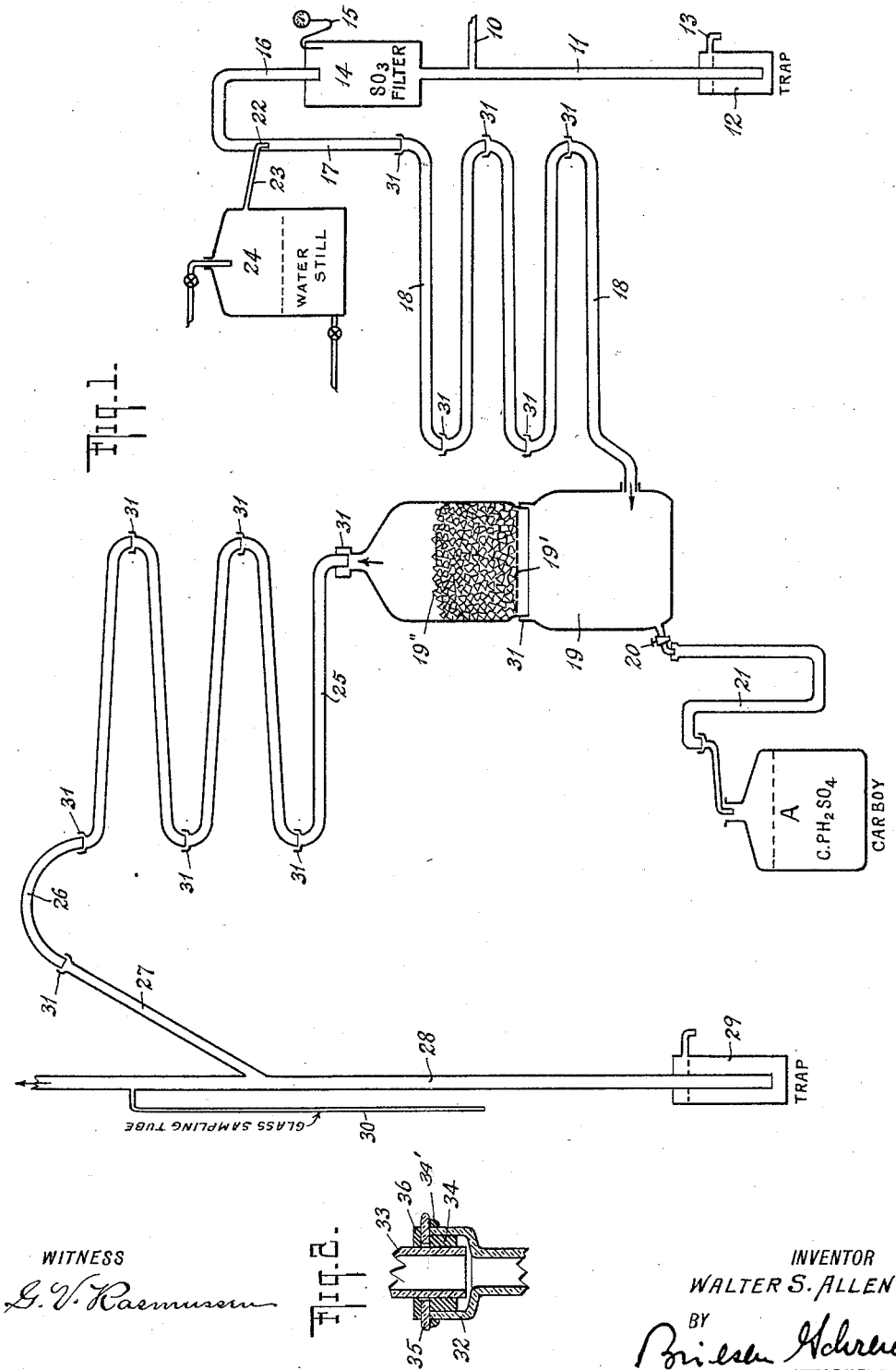

July 5, 1932.   W. S. ALLEN   1,865,607
APPARATUS FOR THE MANUFACTURE OF SULPHURIC ACID
Original Filed Aug. 29, 1924   2 Sheets-Sheet 2
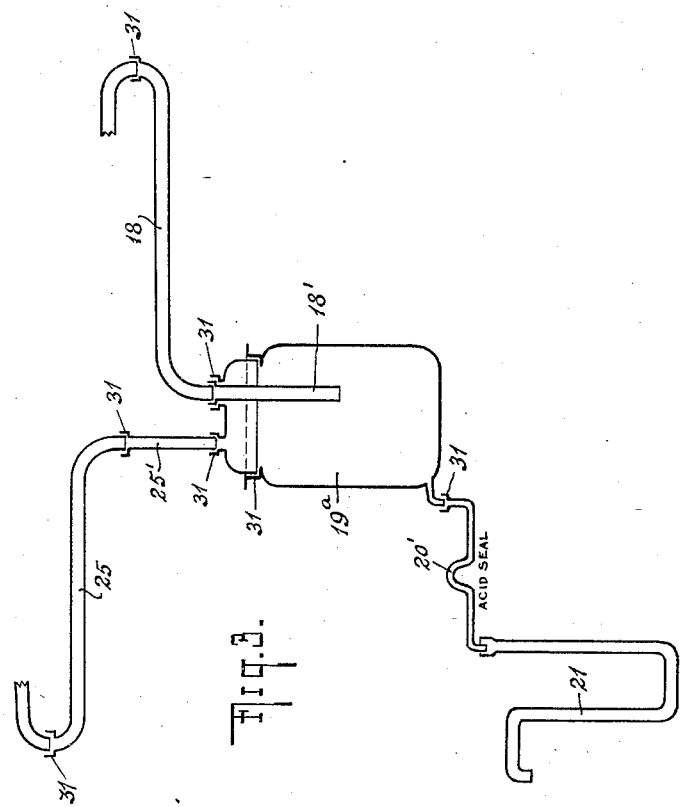
WITNESS
INVENTOR
WALTER S. ALLEN
BY
ATTORNEYS Patented July 5, 1932

1,865,607

UNITED STATES PATENT OFFICE

WALTER S. ALLEN, OF FLUSHING, NEW YORK, ASSIGNOR TO GENERAL CHEMICAL COMPANY, OF NEW YORK, N. Y., A CORPORATION OF NEW YORK

APPARATUS FOR THE MANUFACTURE OF SULPHURIC ACID

Original application filed August 29, 1924, Serial No. 734,853. Divided and this application filed January 21, 1926. Serial No. 82,665.

My present invention relates to an apparatus for the manufacture of sulphuric acid and particularly such acid of a purity known commercially as chemical purity. My present application is a division of another application filed by me in the United States Patent Office on August 29, 1924, Serial No. 734,853, in which application I have claimed my improvement in the process of making sulphuric acid. In my present application, I have claimed certain novel features of an apparatus suitable for carrying out the process described and claimed in my said earlier application. As applied to the manufacture of sulphuric acid, the object of such process is to produce acid of high purity (commercially known as chemical purity) by a direct process, that is to say, without a distillation treatment. In other words, such improved process does not produce a raw acid which requires subsequent treatment to bring it to such chemical purity, but yields at once a product of such chemical purity and desired strength. Two satisfactory and preferred embodiments of my apparatus are shown in the accompanying drawings in which Fig. 1 is a diagrammatical elevation, with parts in section, of an apparatus suitable for carrying out the improved process; Fig. 2 is a detail of a joint of such apparatus; and Fig. 3 is a fragmentary view showing a different construction and arrangement of certain parts.

The gases containing the sulphuric anhydride (said anhydride having been produced, in the usual application of my invention, by the so-called contact process from sulphur dioxide and oxygen) enter the apparatus through a pipe 10 connected with an upright pipe 11, the lower end of which dips into a liquid contained in a vessel 12, said vessel thus constituting a trap and having an overflow 13. The upper end of pipe 11 leads to the lower portion of a filter 14 containing a suitable material (such as pieces of quartz) for removing suspended impurities from the sulphuric anhydride. The filter is extremely desirable in obtaining pure acid, as there are impurities in the gases coming from the converters which if not removed will tend to contaminate the product. Of course, if the stream of sulphuric anhydride gas is free from suspended impurities, the filter may be dispensed with, but in practically all commercial installations of my invention, the filter will be found to be necessary to obtain a chemically pure product. The upper portion of the filter may be provided with a manometer 15, and has an outlet from which a discharge pipe 16 conveys the gases to the next portion of the apparatus, that is to say, to the reaction or absorption chamber. This chamber consists of a tube 17 suitably constructed to provide a path of sufficient length for the completion of the desired reaction, and this reaction chamber connects with a cooler or condenser 18, here shown as a coil made with S-bends. The outlet of the condenser discharges into a tower 19, preferably made in two sections for convenience in manufacture, said tower being of much larger cross-section than the cooler pipe. At the bottom of the tower 19 is located a suitable draw-off device, for instance a cock 20 from which the liquid product may be passed through a U-shaped outlet tube 21 to a carboy A or other receptacle. Those parts of the apparatus which come in contact with sulphuric acid, that is to say, the reaction tube 17, the coolers or condensers 18 and 25, the tower or collector 19, the cock 20, and draw-off pipe 21, are made of a material, such as for instance silica or glass, not attackable by sulphuric acid. As indicated in Fig. 1, I may put a perforated silica plate 19' between the two sections of the tower 19, and partially or wholly fill the space in the tower above the partition, with a suitable packing, such as quartz, or short sections of small silica pipe. The use of such tower packing is of advantage in the production of C. P. oleum, but is generally dispensed with when making acid of less than 100% strength.

The condenser 18 is shown as an air-cooled condenser and is generally operated as such since, as hereinafter more fully explained, the chilling of the vapors is not desirable. However when an increased cooling effect is required, as on very hot summer days, it may be desirable to employ water-cooling, as by allowing water to trickle over the outer surface of the condenser. The U-tube 21, which I prefer to make of glass, is provided with any suitable arrangement (not shown) for cooling it with water.

Within the reaction chamber 17 extends the nozzle 22 of a pipe 23, supplying hot hydrogen oxide, generally as steam. Preferably this nozzle and pipe, or at least such portions thereof as are within the pipe 17, are made of material not attacked by sulphuric acid. The steam may come from any suitable source, for instance, a still 24.

The outlet at the upper end of the tower 19 is connected with a condenser which may consist of a superposed, preferably inclined pipe 25 with suitable connections. This condenser may be water-cooled, as by allowing water to trickle over its outer surface but air cooling is generally sufficient. Its outlet is connected with one end of an upwardly arched pipe 26, the other end of which is connected with a pipe 27 communicating with an upright pipe 28, the upper end of which has a suction connection to a coke box or filter (not shown) while its lower end dips into liquid in a trap 29. The pipe 27 is generally made of iron, but the pipes 25, 26 and the other parts of the condenser connected with the top of the tower 19 are made of silica or other material not attackable by $H_2SO_4$. At 30 I have indicated a glass tube for sampling the exit gas.

At various points of the apparatus, for instance, those indicated at 31 in Fig. 1, I employ an improved joint which will resist the action of hot strong sulphuric vapors. Details of such a joint are shown in Fig. 2. The end of one of the pipes is shown as made with an enlargement or bell 32, the adjacent end 33 of the other pipe extending into said bell. Between 32 and 33 I place first one or more coils of blue asbestos rope (about one inch diameter which has been pickled in hot sulphuric acid). This prevents the superimposed loose asbestos from falling into the pipes. Above the rope loose purified blue asbestos is packed to fill the space flush with the top of bell 32. The top of the bell is then covered with a glass ring 35, fitted around the pipe 33 and projecting about one inch beyond the outside of 32. A coil of small blue asbestos rope 34' is fitted around 32 underneath the glass and cemented in place by a layer of blue asbestos soaked in sodium silicate. A similar coil 36 is fitted around 33 and above the glass and cemented in place by the same mixture. This cementing material is easily replaced when repairs are necessary. The glass ring 35 protects the asbestos packing 34 from all outside impurities and makes it possible to seal the joint properly. The blue asbestos packing 34, purified as described by the action of hot concentrated sulphuric acid, is not attacked at all by hot strong sulphuric vapors; it is, moreover, cheap and durable. The same procedure is followed in cementing together the two tower sections.

The gas containing about 8% sulphuric anhydride ($SO_3$) and coming, for instance, from the converter of a plant in which sulphuric anhydride is produced by catalytic action, is delivered (by the pressure of the blowers forming part of said plant) through the pipe 10 to the filter 14. The temperature of the gas entering the pipe 10 will of course vary, depending upon the drop in temperature which the gas is allowed to experience after leaving the converter system but in my preferred method of operation will be about 200° F. The filter removes impurities from the converter gases before they come in contact with the steam at 22. The injection of hot hydrogen oxide (steam) at 22 in controlled volume to form acid of say 95% $H_2SO_4$ results in a sudden rise in temperature to about 450° F., with a corresponding large increase in the volume of gas. In the reaction chamber 17, steam and $SO_3$ mix and react with each other and form $H_2SO_4$ vapor with the liberation of a large amount of heat. The formation at this stage of a vapor as distinguished from the formation of a mist is an important consideration as explained in greater detail in my co-pending application for the process. The high temperature generated by the reaction of the sulphuric anhydride and the steam, while productive of excessive corrosive action unless proper materials are chosen for the equipment, is of particular importance in the operation of the process. With respect to the materials chosen for the equipment, iron or other ordinary metals would be attacked by the hot $H_2SO_4$ vapor, and the resulting sulphuric acid would therefore not be of chemical purity but would be contaminated by the iron or other metal. For this reason, I employ a resistant substance, such as silica, as the material for the reaction chamber 17 and for the other parts with which the sulphuric acid comes in contact. It is true that, theoretically, platinum or gold would also be suitable; however, their high price precludes their use in practice.

It will be noted that the nozzle 22 discharges the material admitted therethrough (in this case steam) in the direction of the gas current, and thus helps its flow. The proportion of steam admitted may be regulated by a cock or in any other suitable manner, and the strength of the final product may thus be varied as desired subject, of course, to a corresponding temperature modification which will assure the desired vapor condition in the product. In this way I may, for instance, readily obtain concentrations varying from 30% oleum to 70% $H_2SO_4$.

The aforesaid acids are herein termed relatively strong acids.

A titrimeter may be employed to check or control the strength of the product. If the product should become too weak, then the amount of steam admitted to reaction chamber 17 is decreased, so that the concentration of the product will be increased. On the other hand, if the concentration of the product becomes too high, then obviously the amount of steam admitted should be increased. It is to be observed, however, that in any case the steam and the sulphuric anhydride are always admitted under such conditions with respect to amounts and temperatures that the resultant product is either in the form of a vapor or readily convertible into that form by the aid of supplemental heat. When $SO_3$ and $H_2O$ are brought together in proper amounts to form directly a relatively strong acid product and at temperatures appropriate to accomplish the objects of this invention, the heat of formation of $H_2SO_4$ is sufficiently great to maintain the entire mass in the state of a vapor, but if substantial amounts of mist are formed, the product should first be converted into vapor by supplemental heat, since it is only when the product is in the form of a vapor that the condensation and collection of the sulphuric acid will proceed with that efficiency and facility which is contemplated by my invention.

The sulphuric acid vapors are condensed in the cooler 18 and flow into the lower portion of the tower 19, from which they are drawn off through the cock 20, which under normal conditions is kept open just the right amount to withdraw the liquid sulphuric acid at the same rate at which it flows into the tower 19. The gaseous remnant passes to the upper portion of said tower and to the cooler communicating with the outlet of said tower, and any sulphuric acid produced by further condensation in said second cooler flows back into the tower, particularly if the pipes 25 are inclined as shown. The percentage recovery of $SO_3$ in the tower will vary up to a maximum of practically complete recovery, depending upon the size of the cooler 25 and the temperature at which it is maintained. By proceeding in the aforesaid manner, the acid vapor may be condensed without any serious difficulty as the mass of vapor being condensed is substantially free from acid mists which tend to persist in a dispersed condition and to resist aggregation and condensation. Inasmuch as all the parts from 17 to 26 inclusive are made of material not attacked by hot strong sulphuric acid, the production of sulphuric acid of chemical purity is assured.

The expansion in volume resulting from the injection of hot hydrogen oxide tends to produce a relatively high pressure in the absorbing, condensing, and collecting part of the apparatus. As this high pressure would force the sulphuric acid vapors out through any leaky joints, I place the apparatus under suction at the delivery end, by connecting the upper end of pipe 28, for example, with the coke box of the contact plant for the production of $SO_3$. Thus, in the event of a leak, there will be no escape of gases, but only an inflow of air at the leak. I find it advisable to admit sufficient volume of $SO_3$ contact gas, as shown by the pressure on manometer 15, so that there will be an essentially balanced or neutral pressure at the outlet 20 of tower 19. This prevents sucking in of air or flowing out of acid gases through this discharge pipe.

It will be noted that the liquid product is withdrawn at the middle of the apparatus, that is to say, between the two coolers. The product withdrawn from the tower 19 is therefore sufficiently hot to be practically free of absorbed $SO_2$ (within the requirements of chemical purity) and at the same time I am enabled to obtain a high percentage yield of acid. My system in which I provide a collector for the condensate between two coolers, with the second cooler arranged to drain back into the collector, is especially valuable in that I can maintain the temperature of the condensate at such a value as desired to result in the elimination of gaseous impurities, and at the same time obtain a high percentage of recovery, without necessitating the use of complicated apparatus. My system is of simple construction and of a type readily constructed of material not attackable by sulphuric acid.

The sudden decrease in velocity, as the gases pass from the relatively narrow pipe 18 into the wide tower 19, assist in bringing about condensation of the sulphuric acid vapors.

In the construction illustrated by Fig. 3, the reaction products flowing from the cooler 18 enter through an opening in the tower cover, as through a depending pipe portion 18′, while the residual gas leaves through another opening in said cover, as by way of a pipe 25′. This figure also shows the use of an acid seal 20′ in the pipe 21, for the continuous discharge of acid from the tower 19a, the stop cock 20 being omitted in this case. It will be understood that the parts not illustrated in Fig. 3, and connected with the parts 18, 21 and 25 respectively, may be of the same construction as shown in Fig. 1.

The entire product may flow through a suitably constructed titrimeter (made of glass), after leaving the tube 21.

The success of the process carried out in my apparatus need not be fully set forth herein, as the same is explained at length in my co-pending application, Serial No. 734,853.

It is obvious that my apparatus, although especially adapted for the production of sulphuric acid known as chemically pure sulphuric acid, may be used for the production of acid of ordinary commercial purity if desired.

Various modifications may be made without departing from the nature of my invention as defined in the claims.

I claim:

1. An apparatus of the class set forth, comprising a reaction chamber having a gas inlet, means for injecting a fluid, and an outlet, a cooler, the inlet of which is connected with said outlet, a collector for the product, and a second cooler connected with the outlet of said collector, said coolers being made in sections, the joints of which are packed with asbestos previously pickled in hot concentrated sulphuric acid.

2. An apparatus of the class set forth, comprising a reaction chamber having a gas inlet, an outlet, means for injecting a fluid between said inlet and said outlet, toward the latter, a cooler, the inlet of which is connected with said outlet, a collector for the product, and a second cooler connected with the outlet of said collector, said coolers being made in sections, the joints of which are packed with asbestos previously pickled in hot concentrated sulphuric acid.

3. An apparatus of the class set forth, comprising a reaction chamber having means for the admission of a fluid, a condenser, the inlet of which is connected with the outlet of said reaction chamber, and a collector connected with the outlet of the condenser, said parts being made of a material not attackable by hot strong sulphuric acid, whereby such apparatus becomes available for the direct production of sulphuric acid of chemical purity, said collector being made in sections, the adjacent ends of which are packed with asbestos previously pickled in hot concentrated sulphuric acid.

In testimony whereof I have hereunto set my hand.

WALTER S. ALLEN.